July 10, 1956
W. E. JOHNSON
2,754,087
MOBILE DRILLING EQUIPMENT
Filed June 12, 1953
4 Sheets-Sheet 1
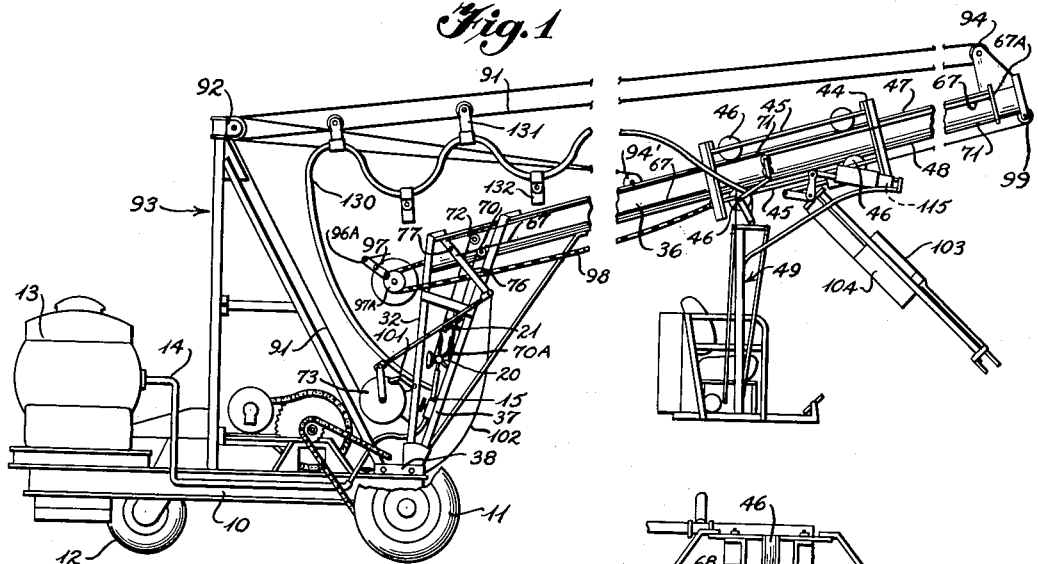
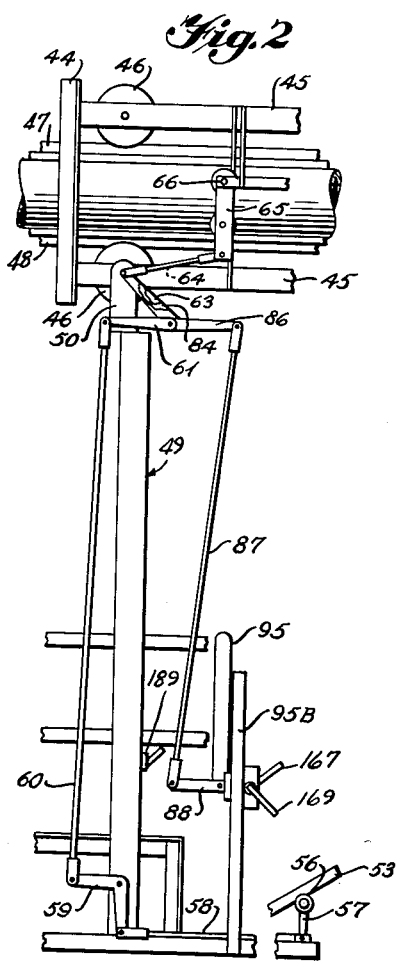
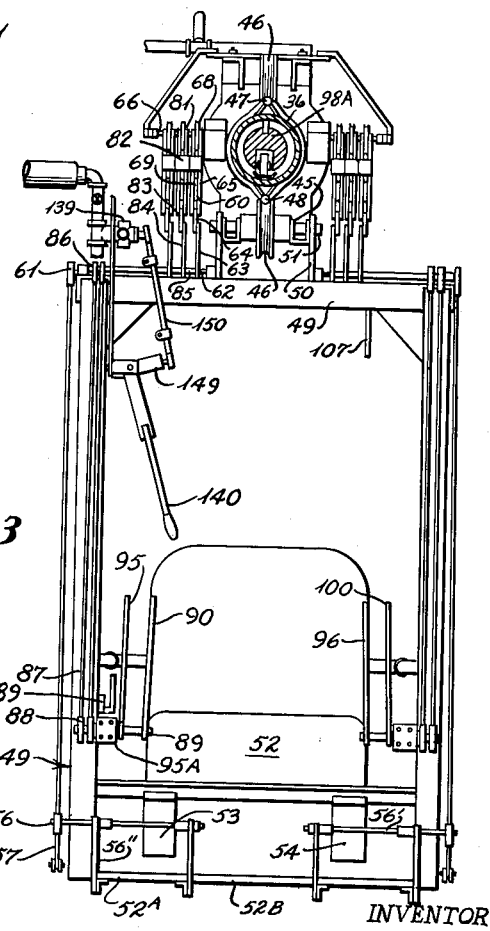
INVENTOR
William E. Johnson
BY A. Yates Dowell
ATTORNEY July 10, 1956     W. E. JOHNSON     2,754,087
MOBILE DRILLING EQUIPMENT
Filed June 12, 1953     4 Sheets-Sheet 2
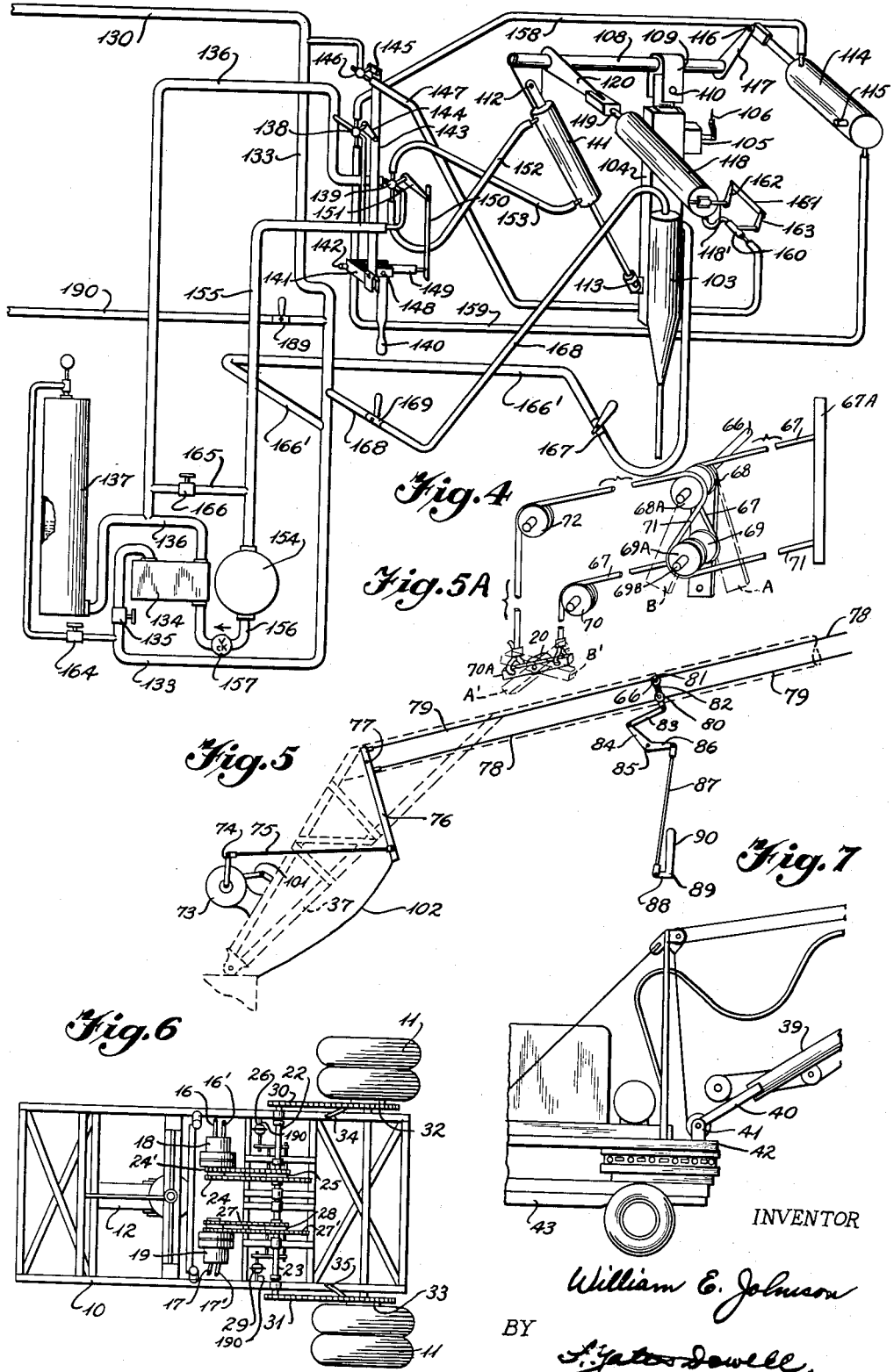
INVENTOR
William E. Johnson
BY
ATTORNEY July 10, 1956
W. E. JOHNSON
2,754,087
MOBILE DRILLING EQUIPMENT
Filed June 12, 1953
4 Sheets-Sheet 3
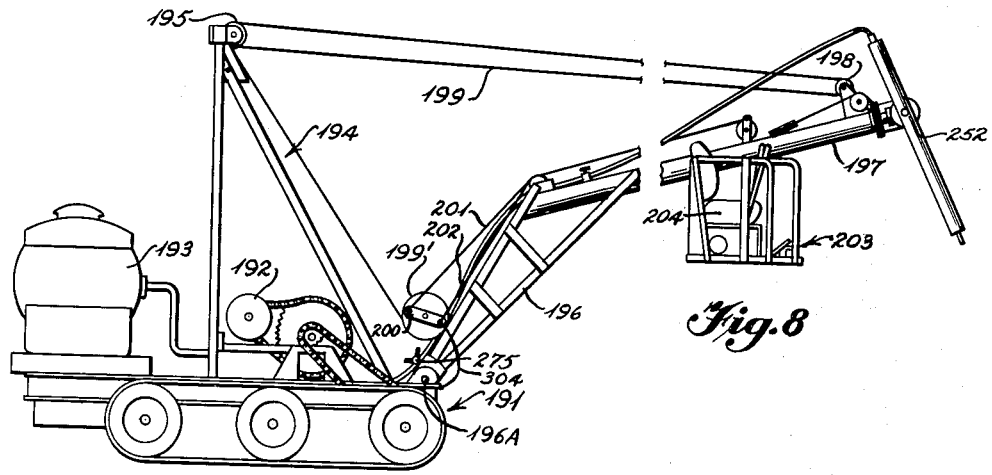
Fig. 8
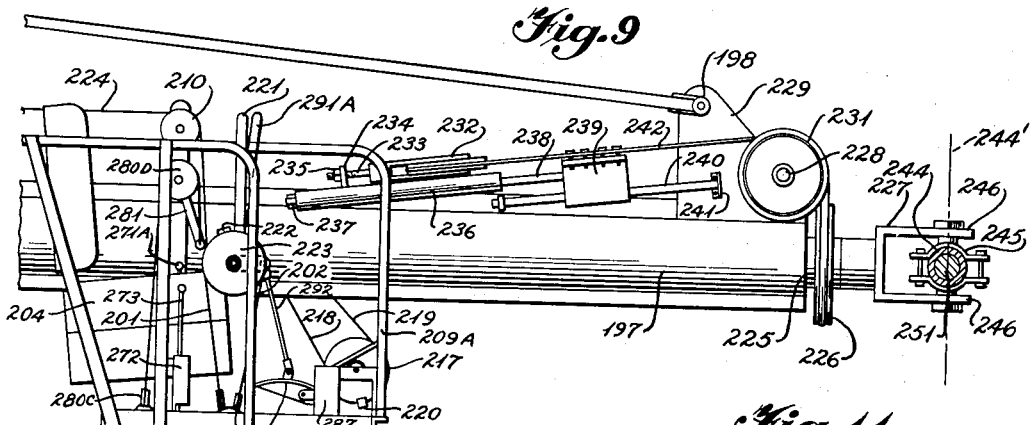
Fig. 9
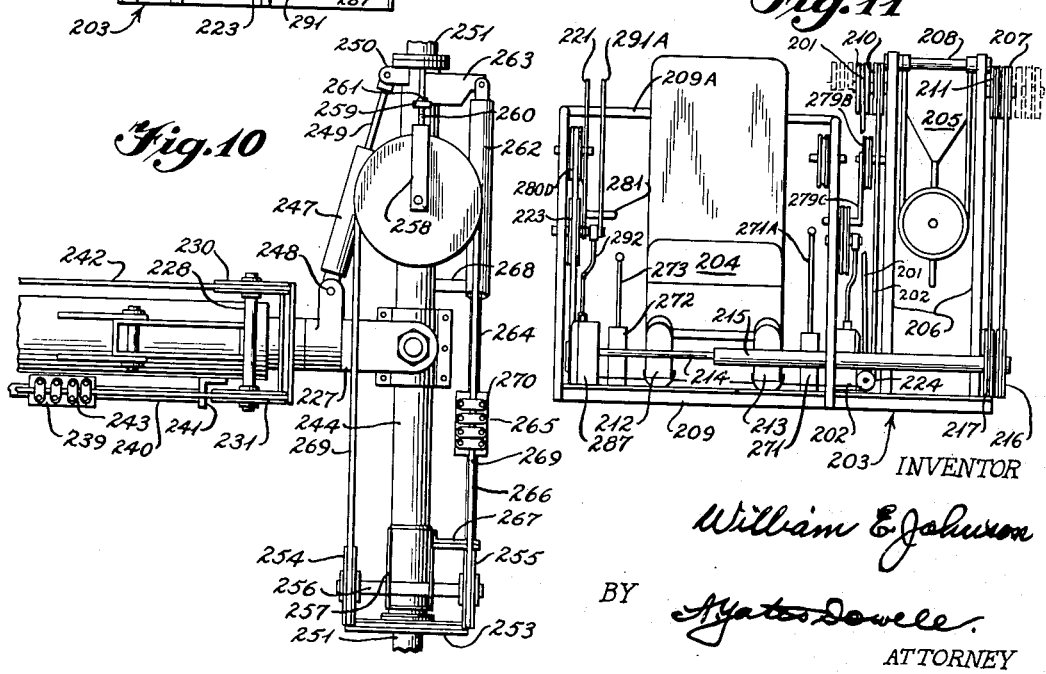
Fig. 10
Fig. 11
INVENTOR
William E. Johnson
BY A. Yates Dowell
ATTORNEY July 10, 1956
W. E. JOHNSON
2,754,087
MOBILE DRILLING EQUIPMENT
Filed June 12, 1953
4 Sheets-Sheet 4
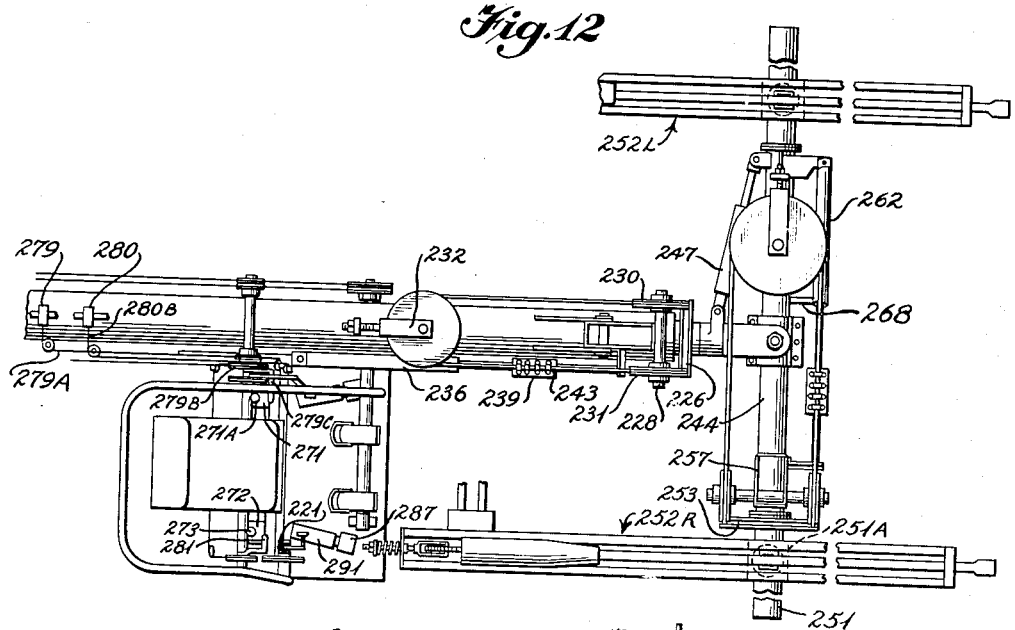
Fig. 12
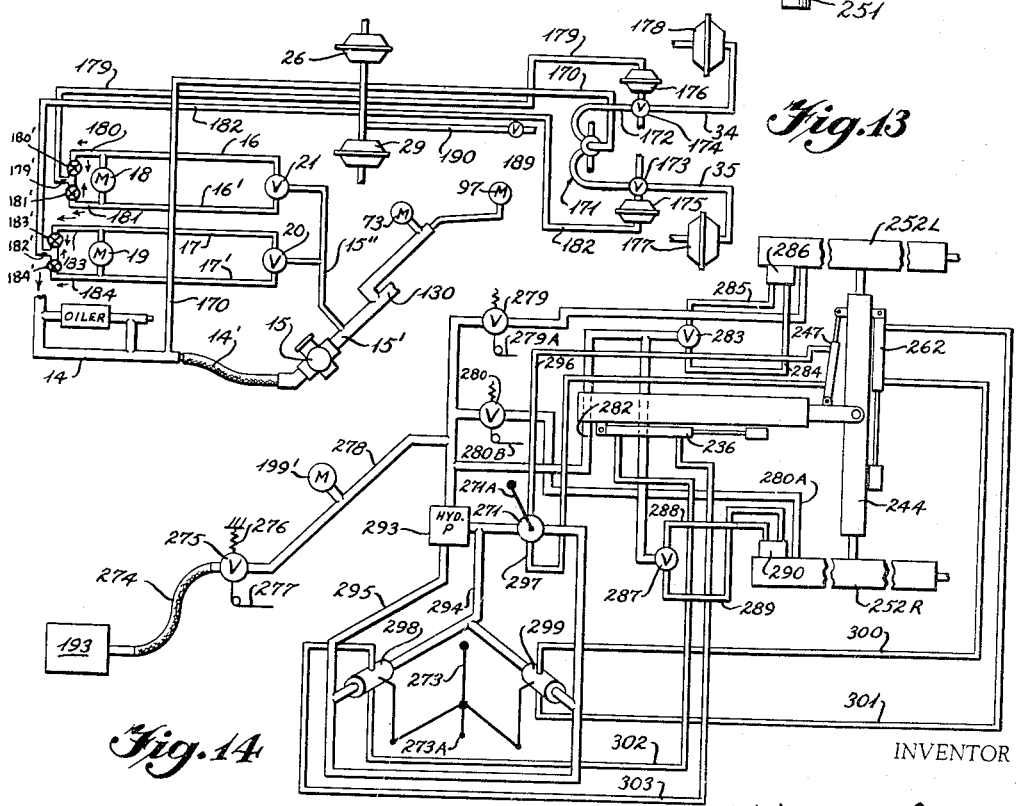
Fig. 13
Fig. 14
INVENTOR
William E. Johnson
BY
Ayates Dowell
ATTORNEY

United States Patent Office 2,754,087

Patented July 10, 1956

2,754,087

MOBILE DRILLING EQUIPMENT

William E. Johnson, Wilson, N. C., assignor to Travel Drill Company, Inc., Raleigh, N. C., a corporation of North Carolina Application June 12, 1953, Serial No. 361,220

16 Claims. (Cl. 255—51)

This invention relates to mobile equipment of various kinds including although not restricted to that used in land mining and specifically in removing rocks from quarries.

More particularly the invention relates to mobile units including a vehicle or other supporting structure on which is mounted a power plant, a source of compressed or hydraulic fluid and a boom on the outer end of which some work is done under the direction and control of an operator located on the vehicle.

Heretofore equipment has been mounted on wheeled vehicles and propelled manually by motor vehicles or in other ways while other equipment has been mounted directly on motor vehicles. Mobility of equipment of this character has been limited on account of the necessity for moving compressed air and other pipe or hose lines and other equipment. Maneuverability of the working portions of the equipment likewise has been limited. This has been caused at least in part by the distance between the operating mechanism and the operating station on the vehicle or supporting structure. Prior art equipment has been inadequate and could not be satisfactorily used particularly on certain terrain for example on large boulders where it has not been possible for the workman to ascend and drill or perform other desired operations.

It is an object of the invention to simplify and improve prior devices as well as to produce equipment which is less expensive and which has greater movability, maneuverability, and with an operator's control station maneuverably supported near the place where the work is being performed and from which not only is the maneuverability of the control station and the operating mechanism controlled but the mobility of the supporting structure as well.

Another object of the invention is to provide relatively inexpensive mobile equipment which can be operated in limited areas and in different elevations including above, below, and on either side of the supported vehicle as well as in between and in which the operating mechanism can be moved and operated under fingertip control of the operator from a maneuverable station in close proximity to the point of operation.

A further object of the invention is to provide mechanism by which drilling can be accomplished with substantially the same facility as when the drill is held by the operator, but with the advantage that the drill is held mechanically, permitting the use of drills of larger size, and the operator is sufficiently far away from the point of impact that he is substantially out of physical danger including from dust produced during drilling.

Further objects and advantages of the invention will be apparent from the following description taken in conjunction with the accompanying drawings, wherein:

Figure 1 is a side elevation of a mobile drill illustrating one application of the invention;

Fig. 2, an enlarged fragmentary detail of the control chair and its mounting in side elevation;

Fig. 3, a front elevation of the control chair and its mounting;

Fig. 4, a diagrammatic layout of the hydraulic and pneumatic system for locating and operating the drill and for shifting the gear driving range of the vehicle;

Fig. 5, a detail of one of the control cable systems specifically showing the operation of the hoist motor for raising and lowering the boom;

Fig. 5A, a perspective of the control cables, pulley frames, and valves for controlling the left wheel drive mechanism;

Fig. 6, a top plan view of the vehicle chassis and drive mechanism with parts omitted, illustrating the individual drives for the wheels;

Fig. 7, a fragmentary detail illustrating in side elevation the turn-table mounting for the boom in accordance with one embodiment of the invention;

Fig. 8, a side elevation of a modified form of mobile unit with a control chair pivoted at a fixed location on the boom with a pair of drills mounted on the end of the boom and employing belt traction about the wheels;

Fig. 9, an enlarged detail illustrating in side elevation the free end of the boom of the modifications of Fig. 8 with the control chair and drill support;

Fig. 10, a top plan view of the outer end of the boom shown in Fig. 9;

Fig. 11, a front elevation of the control chair of the modification shown in Figs. 8 and 9;

Fig. 12, a top plan view similar to Fig. 10 illustrating a further modified form of the outer end of the boom and operator's control chair;

Fig. 13, a diagram of the pneumatic control system for operating the motors and brakes for the driven wheels; and Fig. 14, a diagrammatic showing of the hydraulic and pneumatic systems for positioning and operating the pneumatic drills of the second modification for underground mining.

Briefly stated the present invention is a mobile maneuverable operating unit or device including mobile supporting structure, maneuverable operating structure, and a cooperatively maneuverable control station from which operation of the entire device including its mobility and maneuverability is within convenient access of an operator of such control station being in sufficient proximity to the operating mechanism to afford adequate visibility and access for proper efficient operation of the equipment. The supporting structure may be of any desired character such as a vehicle with wheels or other traction means such as chains, belts or walking members for engagement with and travel upon the earth's surface, and may include suitable structure to provide a continuous sustaining surface where the terrain is irregular or relatively soft. The invention also contemplates a sustaining structure capable of traveling on the water.

With continued reference to the drawings, the device of the present invention comprises a vehicle or other supporting structure having a frame 10 and two or more propulsion elements such as drive wheels 11, and a caster or pivot wheel 12.

On the frame 10 is mounted a motor compressor unit 13 of conventional character for supplying compressed air for performing the necessary work. Air is supplied from the compressor through line 14, at least a part of which is flexible, to a main cut-off valve 15 on boom support frame 37 from which compressed air is supplied to the various parts of the device.

Air from the cut-off valve 15, as shown in Fig. 13, is supplied through lines 15' and 15'' through four-way valves 20 and 21 and thence through lines 16, 16' and 17, and 17' to air motors 18 and 19 under the influence of conventional four-way control valves 20 and 21 mounted on the boom support frame 37 (see Fig. 1) and supplied with air from valve 15.

The motors 18, 19 drive the wheels 11 from the shaft 22 (Fig. 6) through suitable sprockets fixed on the motor shaft and driven by chains 24 and 24'. Clutch element 25 splined on the shaft 22 is selectively movable into driven relation wtih the large or small sprocket rotatable on the shaft 22. Clutch element 25 is normally in the low gear range and is controlled by pneumatic device 26, for high gear operation. The motor 19 similarly drives the shaft 23 by suitable sprockets and chains 27, and 27', clutch element 28 is controlled by pneumatic device 29. The shafts 22 and 23, drive the wheels 11 by means of sprocket and chain drives 30 and 31 and conventional gear reduction units, not shown.

Conventional air brakes 32 and 33 may be provided supplied with air by lines 34 and 35 and by means of which the neceesary braking force is obtained. A conventional hand brake not shown, may be provided for maintaining the brakes applied when the equipment is not in use.

The propulsion motors 18 and 19 are operated independently, each being automatically released when the respective motor is operated. The machine may be spun around by using only one motor. The wheel on the opposite side then acts as a pivot. The wheels 11, one on each side of the machine, are rotated producing forward or backward movement of the vehicle, the caster wheel 12 following such movement; maneuverability is obtained by independent operation of the wheels. The wheel at one side of the vehicle may be operated at a different speed or in a reverse direction from that of the wheel on the other side of the vehicle, whereby relative turning of the vehicle will be produced.

In the modification of the invention illustrated in Fig. 7 a boom 39 may include a supporting frame 40 supported for raising and lowering movement on brackets 41 on a turn-table 42 mounted on the frame of a conventional truck or other vehicle 43.

The turn-table may be rotated by means of a conventional reversing air motor mounted on the turn table and drivingly connected by means such as a pinion on the air motor shaft engaging a ring gear or the like, on the fixed circular trackway that supports the turn-table. A chain engaging the fixed trackway and a sprocket on the air motor may alternately be used for such purpose.

A tubular boom 36 (Fig. 1) may be supported by a frame 37 pivoted on brackets 38 on vehicle frame 10. Movably mounted on the boom 36 is a carriage frame comprising end members 44 connected by bars 45 between which are mounted grooved rollers 46 above and beneath the boom for engagement with tracks 47 and 48 fixed to the upper and lower surfaces of the boom 36.

A control station or chair is adjustably mounted on the boom 36. Such control chair includes a rectangular frame 49 suspended by supports 50 from a shaft 51 carried by angle bars 45. The shaft 51 supports one of the grooved rollers 46 which engages the lower track 48.

*The control chair*

The control chair includes a seat 52 with a conventional backrest and a floor 52A beneath the chair and having a centrally cut-out portion 52B to permit the drill to extend in a vertical or slightly rearwardly inclined downward direction.

Pedals 53 and 54 located on opposite sides of the cut-out portion control the operation of propulsion motors 19 and 18 respectively, by controlling the four-way valves 20 and 21 mounted on the boom support 37.

The pedals 53 and 54 are fixed to rock shafts 56 and 56' mounted in suitable bearings in brackets 56''. An arm 57 is fixed on the outer end of the rock shaft 56 and has its free end connected by a link 58 to a bell crank 59 pivoted to the lower end of upright rectangular chair frame 49, the other arm being pivoted to link 60 which has its upper end pivoted to arm 61 fixed to a rock shaft 62 mounted in suitable bearings carried on the top of the rectangular frame 49. The arm 63 fixed on the inner end of the rock shaft 62 projects upwardly and rearwardly and is pivoted to a link 64 which in turn is pivotally connected to a pulley frame 65 mounted for oscillation about a shaft 66 fixed to the carriage frame. The pivot between arm 63 and link 64 is in the axis of the grooved roller 46 and the shaft 51 from which the chair frame 49 is suspended and the rocking motion of the chair has no effect on the linkage permitting controlled operation thereof in all positions. As shown in Fig. 1 and Fig. 5A control cable 67 is fixed to a transverse member 67A, at the front end of the boom and runs parallel to the boom 36 over the upper pulley 68 of the pulley frame 65 thence between the pulleys 68 and 69, around the lower pulley 69, thence rearwardly over a guide pulley 70 to a two armed control lever 70A on the four-way control valve 20. A second cable 71 is secured to the bottom of transverse member 67A and extends parallel to the boom rearwardly under pulley 69A and between pulleys 69A and 68A, over pulley 68A, rearwardly to a guide pulley 72, and thence to another arm of the control lever 70A of valve 20. As shown in Fig. 5A, the pulleys 68 and 68A are independently rotatable on a fixed shaft 66 and pulleys 69 and 69A are independently rotatable on a stub shaft 69B which is fixed on the frame 65 which frame is shown as a single lever for the purpose of clarity, such frame 65 being pivotally mounted on fixed shaft 66 so that the frame 65 may be moved either to the dot-dash line position A or B, thereby moving the transverse lever 78 of the four-way valve 20 to the dash-dot line positions A', B', respectively. It will therefore be evident that the carriage may slide along the boom 36 without having any effect on the operation of the valve 20 regardless of what position the valve 20 may be in unless the foot pedal 53 is rocked one way or the other. It will therefore be seen that upon rocking movement of the pedal 53 the operator can operate propulsion motor 19 in either direction and also control suitable brakes hereinafter described which prevent unintentional movement of the vehicle. The motor 18 is controlled by the foot pedal 54 in a similar manner. The other controls from the chair are operated by similar pulley and cable constructions to that described for the operation of valve 20 and needless repetition thereof is omitted.

The boom 36 may be raised and lowered by means of an air hoist motor 73 (Figs. 1 and 5) mounted on boom supporting frame 37 and operated by lever 74 on the hoist motor 73 connected by link 75 with a lever 76 connected to the boom by pivot 77. Control cables 78 and 79 are attached at spaced points to the lever 76 on opposite sides of the pivot 77, for controlling the operation of the hoist motor 73. Cable 78 extends from lever 76 under pulley 80, between pulleys 80 and 81 mounted on pulley frame 82 and over pulley 81 and is secured to the transverse member 67A. Cable 79 extends from the upper end of the rock lever 76 and over pulley 81 of pulley frame 82 and between pulleys 81 and 80 and under pulley 80 and thence to the front of the boom where it is fixed thereto. The pulley frame 82 shown in Figs. 3 and 5 is of the same type as frame 65 shown in Fig. 5A although each frame preferably has two frame members on opposite sides of the pulleys so that the pulleys are sandwiched between said frame members thereby maintaining the cables in proper operative condition. The linkage for operating such pulley frame 82 is clearly shown in Fig. 5. Pulley frame 82 is pivotally mounted on shaft 66 and is connected by link 83 to rock arm 84 fixed to hollow shaft 85 which is telescoped on and is oscillatable relative to rock shaft 62 in a known manner. A rock arm 86 is fixed to the outer end of hollow shaft 85 and is connected by a link 87 to a rock arm 88 fixed to the outer end of a rock shaft 89 fixedly carrying boom hoist operating lever 90 at its inner end.

The air hoist motor 73 includes a drum around which the boom supporting cable 91 is wound and such cable extends to the pulleys in a pulley block 92 at the top of a gantry frame 93 and thence to the pulleys in a pulley block 94 mounted at the free end of the boom. If desired, a run of the cable 91 may pass through the pulley 94' secured to an intermediate portion of the boom. It will be apparent that the number of pulleys and runs of the cable may be varied to obtain the desired mechanical advantage in a known manner. It will be evident that the operation of the boom hoist operating lever 90 serves to actuate air hoist motor 73 through the linkage described for raising and lowering the boom. The air hoist motor is of conventional construction and includes a normally applied spring pressed brake which is released when air is supplied to the motor by operation of the lever 74 in either direction.

The gantry frame may be hingedly or removably mounted on frame 10 for reducing the overall height to permit the passage of the structure through limited overhead clearance.

Air shut-off valve 15 is operated by lever 95 fixed on a hollow shaft telescoped on shaft 89 and rotatably mounted in bearing 95A on the guard rail of the chair. Suitable linkages and a cable are provided for operating the cut-off valve 15 against the tension of the spring which normally closes such valve. This adds an element of safety since breakage of the cable shuts off the air. A conventional ratchet may be provided to hold lever 95 in operating position.

A hand lever 96 through suitable links, levers and cables controls an operating lever 96A on air hoist motor 97 which is similar to motor 73 but is provided with a sprocket 97A driving a chain 98 having one end connected to the rear of the carriage frame and another portion of the chain extending along the bore of the tubular boom 36 and a portion of said chain or an extension of cable thereof passes around a pulley 99 and thence is connected to the front end of the carriage frame. Operation of the air hoist motor 97 serves to move the carriage and the suspended chair inwardly and outwardly along the boom, and the brakes of the hoist motor 97 maintains the carriage in adjusted position. A roller supported counterweight 98A may be mounted in the hollow boom and secured to the chair by means of the chain 98 and cable to counterbalance the chair and maintain the center of gravity of the vehicle and boom substantially constant.

A hand lever 100 through suitable shafts, links, rocker arms, pulleys and cable serves to control a latch 101 which is spring-pressed into engagement with ratchet teeth on the winding drum of the boom hoist air motor 73 to prevent retrograde movement thereof and lowering of the boom. To lower the boom it is necessary to first release latch 101 by lever 100 and then operate lever 90.

A safety cable 102 has one end connected to a portion of the vehicle frame 10, in front of the boom pivot and the other end is connected to the rock arm 76. The length of the safety cable 102 is so adjusted that the rock arm 76 will be automatically actuated to prevent excessive raising of the boom beyond a selected safe angle in the event the operator loses control thereof.

*Hydraulic control for positioning the drill*

The pneumatic drill 103 is supported for feeding movement relative to a drill support 104 by conventional feeding mechanism such as a screw feed operated by an air feed motor 105 (Fig. 4) under the control of the operator by means of a Bowden wire or the like 106 operatively connected to a hand lever 107 mounted on rectangular frame 49 for producing the feeding and withdrawal movements of the drill.

The drill support 104 is mounted for universal movement relative to the carriage frame by means of a rock shaft 108 mounted in suitable bearings on the carriage frame for oscillation about a horizontal axis transverse to the boom. A U-shaped yoke member 109 fixed to the rock shaft 108 and a drill support 104 is connected by pivot 110 thereto whereby universal movement of the drill may be obtained about the axes of the rock shaft 108 and pivot 110.

For moving the drill laterally of the boom a hydraulic cylinder 111 is connected by a pivot 112 to the end of rock shaft 108 and has its piston rod connected by pivot 113 to the drill support 104 positioning the drill laterally relative to the boom. A hydraulic cylinder 114 is provided for oscillating the rock shaft 108, said cylinder being connected by a pivot 115 on the carriage frame and the piston rod thereof is connected by pivot 116 to an arm 117 fixed to rock shaft 108. It will be evident that oscillation of rock shaft 108 by the hydraulic cylinder 114 will swing the drill toward and from the operator. Under some circumstances it is desirable to provide for additional forward movement of the drill. This may be accomplished by a pneumatically operated cylinder 118 connected to the carriage frame by a pivot 118' with its piston rod 119 pivoted to an arm 120 fixed to the rock shaft 108.

Compressed air to the drill and to the chair is supplied through a flexible hose 130 under the control of the main cut-off valve 15. The hose 130 may be supported in any desired manner as for example by a series of spaced pulley supported hangers 131 carried on or suspended from the supporting cable 91. Between adjacent pulleys 131, weights 132 are secured to hose 130 to provide uniform loops in each section as the carriage with the chair moves in and out along the boom.

A hydraulic system (Fig. 4) which is preferably located under the seat of the operator is supplied with air from hose 130 to tube 133 through valve 135 to an air operated hydraulic pump 134. The hydraulic pump is of the type which will stall when the hydraulic pressure reaches equilibrium with the compressed air and therefore the desired hydraulic pressure will be maintained without any special control mechanism. Pump 134 supplies hydraulic fluid under pressure to conduit 136 having a branch connected to the lower end of a hydraulic fluid pressure storage tank 137 and the hydraulic fluid from another branch of conduit 136 is carried to two four-way valves 138 and 139 by suitable connections in an obvious manner. The four-way valves 138 and 139 are controlled by a hand lever 140 which is mounted for universal swinging movement laterally of and forwardly and backwardly of the boom corresponding to the desired movement of the drill. The hand lever 140 includes an L-shaped member 141 pivotally mounted on a horizontal transverse axis 142 in line with the transverse arm of the L-shaped member. The other arm of the L-shaped member is pivoted to one end of a link 143 which has its upper end portion pivoted to an operating arm 144 of the four-way valve 138 and to an arm 145 of a two-way valve 146 for controlling the flow of air into tube 147 connected to the pneumatic cylinder 118. The hand lever 140 is L-shaped and connected by a pivot 148 to the said one arm of L-shaped member 141 on axis 142 with the axis of pivot 148 substantially perpendicular to the axis 142. An arm 149 of hand lever 140 is connected by a link 150 to an operating arm 151 of a four-way valve 139 for controlling the flow of hydraulic fluid to cylinder 111 through flexible conduits 152 and 153. The four-way valves 139 and 138 have outlets to conduit 155 for returning the hydraulic fluid to sump 154. Conduit 156 being provided with a check valve which permits the hydraulic fluid to flow in one direction only to the hydraulic pump 134.

When the drill positioning hand lever 140 is moved forwardly or rearwardly, hydraulic fluid is supplied to conduit 158 or 159 operating cylinder 114 thereby oscillating rock shaft 108 moving the drill forwardly or rearwardly in the same general direction as the hand lever 140. The yoke 109 being fixed to the shaft 108 carries the support 104 and therefore the drill is swung forwardly or rearwardly about the axis of shaft 108 in accordance with the actuation of the hydraulic cylinder 114. When the crank arm 117 approaches its dead center position with the drill forward, air is supplied through valve 146 and tube 147 to a valve 160 operated by linkage 161 extending between arm 162 fixed to and therefore oscillated by the cylinder 118 and the operating arm 163 of valve 160. Valve 160 then opens causing the air to urge the drill to its extreme forward out-of-the-way position.

Air is supplied from conduit 133 through a valve 164 to the upper end of the hydraulic fluid storage tank 137 so that the air pressure may be obtained at the upper surface of the hydraulic fluid in the tank. A by-pass 165 is provided between supply conduit 136 and return conduit 155 with a valve 166 to permit hydraulic fluid to flow directly to the sump 154 if the same is desired.

Air is supplied to the drill 103 for the drilling operation by a conduit 166' and controlled by a valve 167 located on the chair at a convenient position. Additional air is supplied for keeping the bore clean through conduit 168 provided with a valve 169 located on the chair.

Referring more particularly to the diagrammatic showing in Figure 13, the control for the travel motors 18 and 19 and the brakes 32 and 33 and the gear change means 26 and 29 include the main air supply pipe 14 with a flexible portion 14' to permit movement of the boom and main valve 15. Tube 170 through branches 171 and 172, supplies air to normally open two-way valves 173, 174, controlled by pneumatic diaphragm devices 175, 176. Extending from valves 173 and 174 are flexible conduits 34 and 35 connected to pneumatic diaphragm devices 177 and 178 which operate the brakes 33 and 32 in a known manner.

The four-way air valves 20 and 21 control the flow of air through conduits 16, 16' and 17, 17' and to the propulsion motors 18 and 19 for causing the motors to operate in forward or reverse direction so that either motor may be operated in either direction independently of the other subject to foot pedal controls 54 and 53 on the chair for moving the vehicle forwardly, rearwardly or swinging the boom laterally. Extending from pneumatic device 176 is a tube 179 having one branch 180 provided with a check valve 180' in communication with tube 16 and another branch 181 having a check valve 181' in communication with tube 16' whereby the air pressure in either tube 16 or 16' serves to operate the pneumatic device 176 actuating valve 174 bleeding the pneumatic device 178 and shutting off the supply of air to conduit 34 thereby releasing the brake 32 permitting the propulsion motor 18 to drive the corresponding wheel 11. A tubular conduit 182 extending from pneumatic device 175 is also provided with branches 183 and 184 having check valves 183' and 184' respectively, in communication with conduit 17 and 17', respectively, and for actuating pneumatic device 175 when air is supplied to travel motor 19 operating valve 173 thereby bleeding air from the pneumatic device 177, releasing the brake 33 and permitting the propulsion motor 19 to operate its wheel. Tubular conduit 179 and tube 182 are provided with bleeding outlets 179' and 182' respectively, drilled with a .0400 in. wire drill to bleed air therefrom, after operation of the respective motors to allow valves 172 and 173 to supply air to the brakes.

It will be evident that the brakes 32 and 33 are applied by the air pressure from the conduit 14, tube 170, tubes 171, 172 and conduits 35 and 36 at all times except when the brakes are intentionally released.

A valve 189 (Fig. 4) located on the chair and supplied with air from conduit 133 controls air pressure in tube 190 in communication with pneumatic devices 26 and 29 for changing the gear range by shifting clutch elements 25 and 28 to the higher gear ratio from the normal or low range.

Referring to Figs. 8 to 12, a vehicle 19' of the traction tread type is driven by propulsion motors 192 through suitable chain drives and gear reduction units similar to that described above and received power from a motor compressor 193 mounted on the rear of the vehicle. A gantry frame 194 with pulleys 195 at the top thereof is removably secured to the vehicle chassis. The rear end of the boom 197 is fixedly supported on the boom supporting frame 196 and such boom supporting frame is pivoted at its lower end on pivot pins 196A which pass through lugs on the vehicle and through the lower end of the boom supporting frame. A pulley block 198 at the forward end of the boom serves to support the boom by means of a cable 199 reeved through the pulleys 198 and 195 to a hoist motor 199' mounted on boom supporting frame 196. The boom hoist motor is provided with a control lever 200 which is operated by cables 201 and 202.

The operator is supported beside the boom 197 in a chair supporting frame 203 provided with a seat 204 and a conventional back rest. An upwardly extending member 205 spaced from the end of the boom is fixed to the upper surface of the boom pivotally supporting swinging arms 206 on opposite sides of the boom for movement about axis 207 of shaft 208 fixed to the upper end of member 205. One or more sills 209 provide a support for the chair and at least one sill is fixed to the bottom ends of swinging members 206 as shown in Fig. 11. Suitable guards and arm rests 209A may be provided as desired. From the above description it will be evident that the chair will maintain an upright position as the boom is raised or lowered as the center of gravity of the chair and operator is below axis 207 of shaft 208. Since the seat 204 is supported by arms 206 which are fixed at their lower ends to the sill 209 of the chair and swing with such chair and the upper ends of such arms 206 are pivotally mounted for swinging movement about the axis of shaft 208 and since the weight of the chair and the center of gravity of the operator are well below the axis of shaft 208 the chair is maintained in proper supporting position by the force of gravity.

Suitable controls are provided on the chair for operating the vehicle in a manner similar to that described in the first modification but a simplified cable control is used as the chair does not move longitudinally of the boom. It will be noted that grooved pulleys 210 and 211 (Fig. 11) are rotatably mounted on swinging members 206 so that the cables carried in the grooves pass substantially through the axis 207, so that the swinging of the chair does not affect the cables. A plurality of pulleys are provided as necessary and foot pedals 212 and 213 are mounted on inner and outer telescopic shafts 214 and 215 carrying pulleys 216 and 217, respectively. A control cable having two runs 218 and 219 is fixed by a clamp 220 to the pulley 217 and each run passes over one of the pulleys 211 and thence back along the boom to a four-way valve similar to four-way valve 20 for controlling the left hand motor. A similar cable construction is operated by pedal 212 for operating another valve similar to valve 21 and it will be obvious to one skilled in the art that suitable guide pulleys will be used as desired.

The boom is raised and lowered by a lever 221 fixed to a drum 223 rotatably mounted on the chair and having a cable with runs 201 and 202 fixed at one point to the drum by a clamp 222. Each run passes from drum 222, under a pulley 223 and thence under a pulley 224 and thence over one of the pulleys 210 and back along the boom guided by suitable pulleys to control lever 200 of boom hoist motor 199'.

Rotatably mounted on the end of boom 197 is a shaft 225 mounted in suitable bearings and carrying a pulley 226 and a yolk 227 fixed to the shaft. A fixed shaft 228 is mounted on pulley support 229 and upon the projecting ends of shaft 228 are idler pulleys 230 and 231. A sheave block 232 is provided with a threaded stem 233 extending through a lug 234 fixed on the boom and adjustment of nut 235 will control the position of the sheave block. A hydraulic cylinder 236 is secured at one end by any suitable means 237 to the boom and the piston rod 238 extending from the cylinder has a slide 239 fixed to its outer end. The slide 239 is slidably mounted on a guiding bar 240 which is fixed at one end to the boom and at its other end to a lug 241 on the pulley support 229. A cable 242 is reeved through pulley block 232, over pulley 230, under pulley 226, over pulley 231 and to clamps 243 on slide 239 and the ends of the cable 242 may be connected together by means of clamp 243. The cable 242 may be tightened by adjusting nut 235 to obtain the required tension. It will therefore be evident that actuation of hydraulic cylinder 236 will cause rotation of pulley 226, shaft 225, and the yoke 227.

A drill supporting sleeve 244 is fixed by clamps 245 which are pivoted for movement about an axis 244' perpendicular to the axis of shaft 225 in bearings in the ends of legs 246 of yoke 227. Another hydraulic cylinder 247 has one end pivotally connected at 248 to a lug projecting from the yoke 227. The piston rod 249 is pivotally connected to a lug 250 on the drill supporting sleeve 244. It will be evident that the extension or withdrawal of piston rod 249 will cause the sleeve 244 to rock about the axis 244'.

Rotatably mounted in sleeve 244 is a drill supporting shaft 251 at the opposite ends of which are adjustable mounted drills 252L and 252R (Fig. 12) by means of collars 251A or the like, which drills include a conventional feed and means to remove the loose material from the bored holes. The drills may be clamped on shaft 251 for angular and lateral adjustment although the drills are normally parallel. Grooved wheel 253 is fixed on the shaft 251 and a pair of pulleys 254, 255 (Fig. 10) are rotatably mounted on a shaft 256 fixed to a support 257 extending from the upper side of sleeve 244. Pulley block 258 is adjustably secured to the sleeve 244 by means of a lug 259 through which a threaded stem 260 of the block passes and is adjustably secured by a nut 261. Another hydraulic cylinder 262 it attached at one end to a lateral projection 263 on the sleeve 244 and the piston rod 264 is attached to a slide 265 which is slidably mounted on a bar 266 extending between a lug 267 and a lug 268, projecting laterally from the sleeve 244. A cable 269 has one end fixed by means of clamps 270 to the slide 265 and passes through the pulley bock 258, over pulley 254 under pulley 253, over pulley 255 and has its other end secured to the slide 265 by other clamps 270. It will be evident that the guide bars 240 and 266 respectively are substantially parallel of the adjacent runs of the cables 242 and 269 so that actuation of the corresponding hydraulic cylinders 236 and 262 produces rotary motion of yoke 227 and of drill supporting shaft 251 respectively, and corresponding drills 252 at each end of the shaft 251.

The hydraulic cylinder 247 is operated from a source of hydraulic pressure through a four-way valve 271 located on the chair and operated by a handle 271A on the left side of the operator. The hydraulic cylinders 236 and 262 are actuated by two four-way valves in a single block 272 controlled by a handle 273 in a manner similar to handle 140 of the first modification so that lateral movement of handle 273 causes the cylinder 236 to be so actuated so that shaft 225 rotates in the corresponding direction and forward and rearward movement of handle 273 actuates cylinder 262 to rotate shaft 251 in the corresponding direction. It will therefore be evident that the operator has complete control of the angular positioning of the drills. The arrangement is such that the shaft 225 can be rotated at least 95° in both directions from a horizontal position of the shaft 251 and the shaft 251 may also be rotated a similar amount which may be increased if desired.

The fluid control diagrammatically illustrated in Fig. 14 includes an air compressor 193, from which compressed air is conducted by a tube including a flexible section 274 carrying air to the main shut-off valve 275, which is normally urged to closed position by a spring 276 and is opened by a cable 277 passing over a guide pulley and thence to a control lever on the chair. From the valve 275 compressed air is conducted by flexible conduit 278 to the hoist motor 199' and through suitable branches to a spring-closed throttle valve 279 for controlling the supply of air for operating the left-hand drill 252L.

A cable 279A passes over a suitable guide pulley and one of the grooved pulleys 210 (Figs. 9 and 11) and thence through suitable guide pulleys up to the drum 279B which is actuated by lever 279C. Another valve 280 which is urged to spring-closed position controls the flow of compressed air through flexible conduit 280A to the right hand drill 252R and a cable 280B passes around a suitable guide pulley and one of the pulleys 210 to other guide pulleys 280C (Fig. 9) and thence to a drum 280D which is operated by hand lever has an inwardly extending portion for engagement by the hand or arm of the operator.

Air is supplied through conduit 282 to a four-way valve 283 for controlling the flow of air through conduits 284 and 285 to the drill feed motor 286 on the drill 252L. A four-way valve 287 controls the flow of compressed air through tubes 288 and 289 to drill feed motor 290 of the right drill 252R. Since the controls for operating the four-way valves 283 and 287 are similar, only the right hand control will be described. The valve 287 may be operated by a foot pedal 291 if desired, but a hand lever 291A pivotally mounted for rocking movement on an extension of the axis of the drum 223 carries an arm which is pivotally connected to a link 292 which in turn is pivoted to foot pedal 291 and therefore the drill feed may be operated by the foot pedal or by the hand control as desired.

The hydraulic system includes an air operated hydraulic motor, a storage tank, a sump, etc., similar to that described above and as indicated diagrammatically at 293. A pressure line 294 and return line 295 are in communication with the system.

The hydraulic cylinder 247 is supplied with hydraulic fluid from a four-way valve 271 controlled by handle 271A in communication with pressure line 294 and having an outlet in communication with return line 295 and flexible conduits 296 and 297 carry the hydraulic fluid to and from the cylinder 247 for swinging the sleeve 244 about the pivot of the yoke as explained above.

The block 272 (Fig. 12) includes a first four-way valve 298 and a second four-way valve 299 which are supplied with hydraulic fluid from supply line 294 and are controlled by a single lever 273 which may move forwardly and backwardly about the universal pivot 273A operating valve 299 to control hydraulic cylinder 262 through flexible conduits 300 and 301 for causing the operative ends of the drills to move up or down. Lateral movement of lever 273 operates the four-way valve 298 to cause hydraulic fluid to flow through flexible conduits 302 and 303 to hydraulic fluid to cylinder 236 which in turn causes rotation of the shaft 225 in a clockwise or counter-clockwise direction corresponding to the lateral direction of movement of the control lever 273.

A safety cable 304 (Fig. 8) may be connected on the frame of the vehicle 191 and to the operating lever 200 of the hoist motor 199' to prevent the boom from being raised beyond a safe height and this is an important consideration in underground mining.

In the various modifications of the invention the parts may be disassembled for shipping. The boom may be removed by withdrawing the usual pivot pins and removing the hoist cable, the chair and the drill may be similarly removed. The connections in the various pneumatic, hydraulic or other lines may be uncoupled by disconnecting the usual type of couplings and the separated parts shipped in any convenient manner. The removable gantry frame may be removed and disassembled for additional compactness. The removal of the parts and assembly may be made by relatively unskilled labor as the various couplings preferably have suitable identification and can therefore be readily assembled.

As explained above the operation of the motor vehicle, the raising and lowering of the boom, the positioning of the drills or other mechanisms, the operation of the same including feeding and retracting may be accomplished directly by the operator from the chair. It will be obvious therefore that a single operator can do more work than he could heretofore perform and at a substantial distance from the drill so that the danger of lung or other physical injury from mining is materially reduced.

What is claimed is:

1. A mobile drill unit comprising a steerable vehicle having a wheel on each side, propulsion means for driving said wheels independently and at different rates of speed, independent braking means for said wheels, a boom, a mounting support for said boom attached at an angle to the latter and pivotally mounting said boom on said vehicle in spaced relation thereto so that it can be swung between substantially upright and sharply depending positions, drilling equipment supported from said boom, means for moving said drilling equipment for locating the same, means for operating said drilling equipment, a relatively short chair-like container for an operator suspended for longitudinal adjustment at an elevation below the outer end portion of said boom in a manner to be maintained upright in all positions of the boom, means for supplying motivating energy to said drilling equipment and to said chair for locating and operating the former and for moving the latter longitudinally of said boom, and control means easily accessible to said chair-like container by means of which the location and operation of the drilling equipment, the position of the chair-like container, the elevation of the boom and the operation of the vehicle can be controlled.

2. A mobile drill unit comprising a steerable vehicle having a wheel on each side, propulsion means for driving said wheels independently and at different rates of speed, independent braking means for said wheels, a boom, a mounting support for said boom attached at an angle to the latter and pivotally mounting said boom on said vehicle in spaced relation thereto so that it can be swung between substantially upright and sharply depending positions, drilling equipment supported from said boom, means for moving said drilling equipment for locating the same, means for operating said drilling equipment, a relatively short chair-like container for an operator suspended at an elevation below the outer end portions of said boom in a manner to be maintained upright in all positions of the boom, means for supplying motivating energy to said drilling equipment and to said chair for locating and operating the former and control means easily accessible to said chairlike container by means of which the location and operation of the drilling equipment, the position of the chair-like container, the elevation of the boom and the operation of the vehicle can be controlled.

3. A mobile drilling unit comprising a steerable vehicle having a wheel on each side, propulsion means for driving said wheels independently and at different rates of speed, independent braking means for said wheels, a boom, a mounting support for said boom attached at an angle to the latter and pivotally mounting said boom on said vehicle in spaced relation thereto so that it can be swung between substantially upright and sharply depending positions, drilling equipment supported from said boom, means for moving said drilling equipment for locating the same, means for operating said drilling equipment, a relatively short chair-like container for an operator suspended for longitudinal adjustment at an elevation below the outer end portion of said boom in a manner to be maintained upright in all positions of the boom, means for supplying motivating energy to said drilling equipment and to said chair for locating and operating the former and for moving the latter longitudinally of said boom, and control means easily accessible to said chair-like container by means of which the location and operation of the drilling equipment, the position of the chair-like container, the elevation of the boom and the operation of the vehicle can be controlled.

4. A mobile drilling unit comprising a steerable vehicle having a wheel on each side, propulsion means for driving said wheels independently and at different rates of speed, independent braking means for said wheels, a boom, a mounting support for said boom attached at an angle to the latter and pivotally mounting said boom on said vehicle in spaced relation thereto so that it can be swung between substantially upright and sharply depending positions, drilling equipment supported from said boom, means for moving said drilling equipment for locating the same, means for operating said drilling equipment, a relatively short chair-like container for an operator suspended at an elevation below the outer end portion of said boom in a manner to be maintained upright in all positions of the boom, means for supplying motivating energy to said drilling equipment and to said chair for locating and operating the former and control means easily accessible to said chair-like container by means of which the location and operation of the drilling equipment, the position of the chair-like container, the elevation of the boom and the operation of the vehicle can be controlled.

5. A mobile drill unit comprising a steerable vehicle having a wheel on each side, propulsion means for driving said wheels independently and at different rates of speed, braking means for said wheels, a boom, a mounting support for said boom attached at an angle to the latter and pivotally mounting said boom on said vehicle in spaced relation thereto so that it can be swung between substantially upright and sharply depending positions, drilling equipment supported from said boom, means for moving said drilling equipment for locating the same, means for operating said drilling equipment, a relatively short chair-like container for an operator suspended beneath the outer end portion of said boom in a manner to be maintained upright in all positions of the boom, means for supplying motivating energy to said drilling equipment and to said chair for locating and operating the former, and control means on said chairlike container by means of which the operation of the drill can be controlled.

6. A mobile drill unit comprising supporting structure, means whereby said supporting structure may be driven and steered while being driven, a boom and a mounting frame pivoted on said supporting structure, drilling equipment supported from said boom, said boom being disposed at an angle to said mounting frame whereby the limits of movements of said boom are from substantially upright position to depending position at a sharp angle to the horizontal, an operator's station longitudinally adjustable on said boom, and control means easily accessible to said operator's station at all times by means of which the driving and guiding movements of said supporting structure, said drilling equipment and the operation of said boom may be independently controlled.

7. A mobile drill unit comprising supporting structure including a driving means at each side of the same, power means for driving each driving means independently, a boom, drilling equipment supported from said boom, a mounting frame attached to said boom at an angle and pivotally supporting the same on said supporting structure so that said boom can be moved between substantially upright and sharply depending positions, a chair suspended to swing vertically beneath said boom, and controls accessible to said chair for controlling the supply of power to said driving means, drilling equipment, and the operation of said boom.

8. A mobile drill unit comprising supporting structure, drilling mechanism, means mounting said drilling mechanism on said supporting structure for movement toward and from said supporting structure and for raising and lowering the same, power means on said supporting structure for driving the same in a generally horizontal manner and for rotating the same about an upright axis, means whereby said drilling mechanism may be actuated, an operator's support mounted adjacent said drilling mechanism and movable therewith for lateral and elevational location, control means adjacent said operator's support for controlling the operation of said unit, the location of said drilling mechanism and the supply of power to said drilling mechanism, whereby an operator may be supported in close proximity to work being done in a manner to simultaneously observe and control the operation of the unit the location of himself the drilling mechanism and the work of the drilling mechanism.

9. A mobile drill unit comprising a steerable vehicle, propulsion means for said vehicle, a boom pivotally mounted on said vehicle, drilling equipment adapted to be operated from said boom, an operator's support on said boom, means for supplying power to the drilling equipment and control means accessible to said operator's support by means of which the operation of the vehicle, steering, movement of the boom, and drilling equipment are controlled, said boom and control means being capable of being readily separable for shipment or storage.

10. A mobile drilling unit comprising a device capable of being propelled, means for controlling the movement of the device, a boom mounted on said device, drilling equipment supported from said boom, a support for an operator carried on said boom in spaced relation from said device, means for supplying motivating energy to said drilling equipment, and control means accessible to an operator on said support by means of which the operation of the drill and movement of said device can be controlled.

11. Drilling equipment comprising a supporting structure for movement from place to place in a path selected by an operator, a boom mounted on said supporting structure for vertical movement, means to move said boom in a transverse direction, an operator supporting station mounted on said boom for movement along the boom toward and from the supporting structure, drilling equipment supported adjacent said station along the boom, means within reach of the supporting station regardless of its position along the boom for positioning and controlling the drilling equipment, moving the station along the boom, raising and lowering the boom and moving the boom laterally, and means for moving the supporting structure from place to place.

12. An apparatus for drilling comprising a supporting structure for movement from place to place, a boom mounted on said supporting structure and movable vertically and swingable from side to side, drilling equipment supported from said boom, operator supporting means on the boom spaced from said supporting structure and adapted to support the operator in all positions of the boom, means for moving the operator supporting means along the boom, and means carried by the operator supporting means whereby the operator has control of the drilling equipment, raising and lowering the boom, swinging the boom from side to side and moving the operator supporting means along the boom.

13. A mobile drill unit comprising steerable mounting structure, propulsion means therefor, a boom carried on said mounting structure, drilling mechanism supported for controlled universal movement on said boom, structure defining a receptive protective control station for supporting an operator for universal movement mounted near the outer end on said boom adjacent said drilling mechanism in a position such that the operator at all times can easily view the work being performed, and means accessible to such operator in said control area for controlling the propulsion and steering of said mounting structure and the supply of power to and the movement and operation of said drilling mechanism.

14. Mobile drill unit comprising steerable mounting structure, propulsion means therefor, a boom carried on said mounting structure, drilling mechanism supported on said boom for controlled universal movement, structure defining a control station for supporting an operator from said boom for vertical movement and horizontal movement adjacent to said drilling mechanism whereby said operator easily may view the work as it is performed, and means accessible to said operator in said control station for controlling the vertical and horizontal movements of said boom and for controlling the supply of power to, and the movement of, said drilling mechanism.

15. The invention according to claim 14 in which said control station is located beneath said boom and is movable therealong in all positions of said boom under the control of said operator.

16. The invention according to claim 15 in which means are provided by which the operator can steer and cause propulsion of said mounting structure from said control station.

References Cited in the file of this patent

UNITED STATES PATENTS

| | | |
|---|---|---|
| 1,991,652 | Bean | Feb. 19, 1935 |
| 2,073,998 | Raby | Mar. 16, 1937 |
| 2,139,772 | Ringe | Dec. 13, 1938 |
| 2,261,483 | Nickles | Nov. 4, 1941 |
| 2,415,205 | Gartin | Feb. 4, 1947 |
| 2,447,667 | Raby | Aug. 24, 1948 |
| 2,614,808 | Curtis et al. | Oct. 21, 1952 |
| 2,616,768 | Stemm | Nov. 4, 1952 |
| 2,627,560 | Eitel | Feb. 3, 1953 |
| 2,639,895 | Gallo | May 26, 1953 |
| 2,646,968 | Curtis | July 28, 1953 |